(12) United States Patent
Kunze et al.

(10) Patent No.: US 7,708,488 B2
(45) Date of Patent: May 4, 2010

(54) JOINT UNIT

(75) Inventors: Ralf Kunze, Bad Essen (DE); Soeren Knopp, Ostercappeln (DE); Manfred Buhl, Bissendorf (DE); Heinfried Helms, Bad Essen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 320 days.

(21) Appl. No.: 11/719,671

(22) PCT Filed: Nov. 16, 2005

(86) PCT No.: PCT/DE2005/002055

§ 371 (c)(1),
(2), (4) Date: May 18, 2007

(87) PCT Pub. No.: WO2006/053538

PCT Pub. Date: May 26, 2006

(65) Prior Publication Data

US 2009/0154988 A1 Jun. 18, 2009

(30) Foreign Application Priority Data

Nov. 19, 2004 (DE) .................. 10 2004 055 961

(51) Int. Cl.
*G62D 7/06* (2006.01)
(52) U.S. Cl. ............... 403/149; 280/93.511; 403/116
(58) Field of Classification Search ........... 403/76, 403/77, 116, 117, 122, 149; 280/93.51, 93.511
See application file for complete search history.

(56) References Cited

U.S. PATENT DOCUMENTS

| | | | |
|---|---|---|---|
| 2,208,325 A | 7/1940 | Krutsch | |
| 2,456,793 A | 12/1948 | Reed et al. | |
| 2,474,959 A * | 7/1949 | Rieves | 403/36 |
| 2,483,621 A * | 10/1949 | Burnett | 403/42 |
| 2,523,321 A * | 9/1950 | Nelson | 403/36 |
| 2,657,945 A * | 11/1953 | Britt | 403/144 |
| 3,380,754 A | 4/1968 | Rauls | |
| 4,613,250 A * | 9/1986 | Laucus | 403/11 |
| 6,446,947 B1 | 9/2002 | Sauvat et al. | |
| 6,481,731 B2 * | 11/2002 | McHale | 280/93.511 |
| 6,508,481 B2 * | 1/2003 | Seyuin et al. | 280/93.511 |
| 7,481,595 B2 * | 1/2009 | Urbach | 403/149 |

(Continued)

FOREIGN PATENT DOCUMENTS

DE    1 988 080    6/1968

(Continued)

*Primary Examiner*—Daniel P Stodola
*Assistant Examiner*—Joshua T Kennedy
(74) *Attorney, Agent, or Firm*—McGlew and Tuttle, P.C.

(57) ABSTRACT

A joint unit of a control arm of a wheel suspension in a motor vehicle, with a housing (1) and a pivot (2), which is mounted slidingly in the housing by a spheroidal bearing surface (3). The joint unit has a catching device (4) to avoid complete separation of the housing (1) from the pivot (2). The catching device spans over part of the housing (1) in a contactless manner during normal operation. The catching device (4) has at least one flexible catching band or at least one securing strap (4.1, 4.2) with a recess (4.1.1, 4.2.1), into which protrudes a catching pin (1.1, 1.2) of the housing in a contactless manner during normal operation, or at least two securing straps (4.1 and 4.2).

15 Claims, 6 Drawing Sheets

U.S. PATENT DOCUMENTS

2002/0096851 A1 7/2002 Seyuin et al.

FOREIGN PATENT DOCUMENTS

| DE | 23 50 087 | 4/1975 |
| DE | 42 24 288 | 1/1994 |
| DE | 44 20 489 | 12/1995 |
| DE | 698 08 791 | 6/2003 |
| EP | 1 000 780 | 5/2000 |
| EP | 1 015 781 | 7/2000 |
| EP | 1 036 280 | 9/2000 |
| NO | WO 99/28636 | 6/1999 |
| WO | WO 99/28636 | 6/1999 |
| WO | WO 03/048602 | 6/2003 |
| WO | WO 2004/083660 | 9/2004 |

* cited by examiner

JOINT UNIT

CROSS REFERENCE TO RELATED APPLICATIONS

This application is a United States National Phase application of International Application PCT/DE2005/002055 filed and claims the benefit of priority under 35 U.S.C. §119 of German Patent Application DE 10 2004 055 961.9 filed Nov. 19, 2004, the entire contents of which are incorporated herein by reference.

FIELD OF THE INVENTION

The present invention pertains to a joint unit of a control arm of a wheel suspension in a motor vehicle, and more particularly to a joint unit with a housing and a pivot mounted slidingly in the housing by means of a spheroidal bearing surface, wherein the joint unit has a catching device for avoiding complete separation of the housing from the pivot, which spans over part of the housing during normal operation in a contactless manner.

BACKGROUND OF THE INVENTION

Wheel suspensions in motor vehicles have various bearings and joints depending on the requirements and the function. For example, ball and socket joints are suitable for making possible a relative motion of two components in a plurality of degrees of freedom. Joint units that have elastomer layers to absorb vibrations introduced via the wheel are known as well. Consequently, the properties of the motor vehicle and here especially those of the wheel suspension can be influenced by means of prior-art joint units not only in respect to the wheel guiding in general but also in respect to an increase in comfort.

Joint units in chassis components are highly stressed safety components, which are usually designed according to the "safe life principle," i.e., in such a way that they are reliable in operation with multiple safety for the entire service life of a motor vehicle. Nevertheless, events or highly unfavorable causal relationships, in which total failure of such joint units may develop, are purely theoretically conceivable. This would be possible, for instance, as a consequence of the wear occurring on the bearing shell or due to the development of corrosion on the ball pivot, because contaminants or water could enter the interior of the joint after failure of the sealing system. The consequence of this could be that a joint unit thus damaged is completely separated, i.e., the connection between the housing and the pivot would separate.

Prior-art joint units comprise a housing and a pivot, the pivot mounted in the housing by means of a spheroidal bearing surface being able to perform a sliding motion within the housing. The spheroidal bearing surface, which may be part of the pivot and can be connected to same in the sense of assembly, is a usual form of bearing geometry in the state of the art. For example, such a joint unit appears from DE-OS 23 50 087 or EP 1 036 280 A1. Since components are connected to one another in such a way that they are movable relative to one another in the prior-art joint units, the taking into account of the wear occurring between the components that are movable relative to one another represents an essential quality feature. Consequently, considerable efforts are made to keep the wear as low as possible over the entire service life of the joint unit or to eliminate it altogether. Prior-art joint units are sealed in a complicated manner for this reason in order to prevent water or contaminants from entering the inner components of the joint. The available solutions are perfected and mostly guarantee the reliable function of the joint units far beyond the service life of the motor vehicle, so that failure of the joint unit can be ruled out.

Nevertheless, it may happen during necessary repair or maintenance work on the wheel suspension of a motor vehicle that parts of the joint unit are damaged inadvertently or in an unnoticed manner. Would this case actually occur, the above-mentioned entry of water and/or contaminants into the interior of the joint unit could not be ruled out with certainty any longer. However, this would lead to a premature, increased wear of the components of the joint unit. Even complete separation of the housing from the pivot would be conceivable in the extreme case. However, such a case must be ruled out for safety reasons. No solutions that could prevent the complete separation of the housing from the pivot have been known in the state of the art so far, so that such a worn vehicle could still be brought to the nearest repair shop, e.g., with an emergency running function.

SUMMARY OF THE INVENTION

The basic object of the present invention is to perfect a joint unit such that an emergency running function of the joint unit continues to be guaranteed even if complete separation of the housing from the pivot develops.

To prevent the complete separation of the housing from the pivot, it is proposed according to the present invention that the joint unit be equipped with a catching device. The catching device may have at least one flexible catching band or at least one securing strap with a recess, into which a catching pin of the housing protrudes in a contactless manner, or at least two securing straps.

If a flexible catching band is used to implement the inventive idea, this band can also span over the housing by direct contact. As a consequence of the guaranteed flexibility of the catching band, the characteristics of the joint unit will not be appreciably compromised. However, a catching band can be preferable used, which spans over the housing in a contactless manner at least in some sections and assumes its actual function only when the joint components seek to separate from one another. The catching device can be designed with such a catching band as a very simple device and thus it can also be made available at a low cost as a retrofitting kit for a joint unit according to the present invention.

Furthermore, one embodiment of the present invention can also be seen in the fact that the housing is equipped with at least one catching pin, which protrudes into a recess present for this purpose on the associated securing strap in a contactless manner during normal operation. The contactless component pairing between the catching pin and the securing strap is necessary because the joint unit must be able to assume its function during normal operation without compromising the wheel suspension of the motor vehicle.

In a very simple mechanical embodiment of a catching device, the catching device has at least two securing straps. These securing straps span over the housing of the joint unit at least in some sections, so that the catching device is able to fix the components separating from one another in an emergency running position in case of a separation of the housing from the pivot due to wear.

To ascertain that the function of a joint unit according to the invention described here, which is present in the motor vehicle, remains guaranteed without limitations, the catching device should span over at least part of the housing in a contactless manner during normal operation. Thus, there preferably is no contact or there is only a slight contact between the catching device according to the present invention and the housing of the joint unit, so that the components of the wheel suspension, which are mobile relative to one another, are not compromised in terms of their freedom of motion. "Normal operation" is defined here as the failure-free function of the joint unit corresponding to its intended use.

It is thus possible to make available, on the whole, a redundant safety system for a joint unit of a control arm of a wheel suspension in a motor vehicle. The system is redundant because the safety of a joint unit is designed to be so high under normal circumstances and conditions of use of a motor vehicle that complete failure is ruled out. A very simple, preferably mechanical safety system is made available according to the present invention, which makes, furthermore, possible the use of prior-art joint units, because it does not compromise the function of these joint units. Thus, it also becomes possible to retrofit prior-art joint units with the catching device, so that it is thus possible to additionally increase the safety of motor vehicles. A variant of the present invention can be seen in that the securing straps span over the housing in a claw-like manner and, during normal operation, in a contactless manner. This variant leads to appreciable advantages in terms of weight.

Moreover, it proved to be advantageous if the catching device is fastened directly to a connection flange of the joint unit or is made in one piece with that connection flange, i.e., it is made as one part with this. A joint unit, which is known per se, can thus subsequently be equipped with a catching device according to the present invention without considerable additional efforts. This is possible especially when the catching device is mounted on the connection flange. The connection flange would otherwise have to be replaced as a whole.

Furthermore, it is particularly advantageous if the catching band is part of a sealing bellows, which protects the inner components of the joint from contaminants and is arranged between the housing and the pivot. The catching band can thus be an integral part of the sealing bellows in a simple manner or it can be connected to same later. To guarantee the function of the catching device, special attention should be paid to the fixing of the edge areas of the sealing bellows on the housing and on the pivot in case of such a design of the catching band as a part of or addition to the sealing bellows, because it depends essentially on these fixing surfaces whether the function according to the present invention can be met.

In a manner that is known per se, the pivot of a joint unit according to the present invention can be fastened to the connection flange or can be made in one piece with same, and, moreover, the spheroidal bearing surface may be part of a joint ball that is mounted on the pivot or is formed on same.

It is also possible for the solution according to the present invention to use a joint ball that is received in a bearing shell inserted into the housing. Accordingly, a special application of the joint unit according to the present invention, which is being described here, can be seen in the fact that this joint unit forms the central joint of a steering triangle of a motor vehicle wheel suspension especially of a utility vehicle and the housing is consequently connected to control arms of the steering triangle.

Preferred embodiments of a joint unit according to the present invention are described in more detail below on the basis of the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
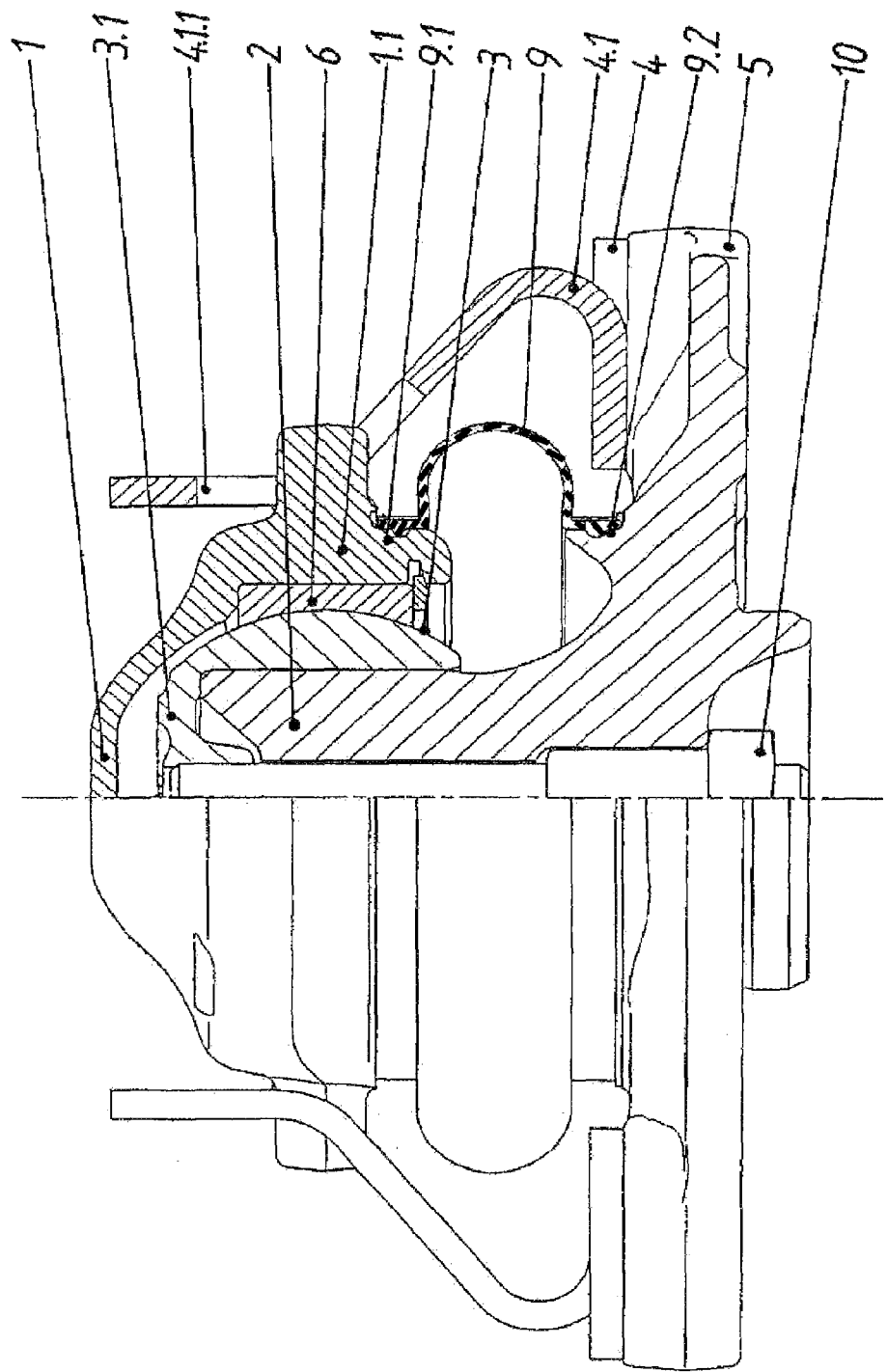
FIG. 1 is a schematically simplified partial view through a first design variant of a joint unit according to the present invention on the example of a steering triangle central joint of a utility vehicle.

Referring to the drawings in particular, the essential features according to the present invention can be explained in the exemplary embodiment of a joint unit according to the present invention, which is shown in FIG. 1 in a partially cut-away and schematic form. Uniform reference numbers will be used below in the individual figures if they are used for identical components or assembly units without this or another view in a figure representing a restriction to the concrete object being shown.

The joint unit in FIG. 1 has a housing 1. The housing 1 is equipped with a pivot-like connection area, at which only a control arm 8 of a control arm pair 7, 8 of a steering triangle for a utility vehicle is visible. The housing 1 is designed here as a housing that is open on one side. It has an inner cavity, into which a bearing shell 6 is inserted. The bearing shell from makes possible a vibration-absorbing bearing function, which also possesses sliding properties, within the joint unit. When viewed towards the interior of the joint, the bearing shell 6 itself has the spheroidal bearing surface 3 of a joint ball 3.1. The joint ball 3.1 is fastened to a pivot 2 by mounting by means of a screw connection 10. A retaining ring 11 is used to secure the bearing shell 6 against migration axially out of the opening of the housing 1.

On the outside, the housing 1 has a catching pin 1.1, which is designed such that it protrudes from the housing surface. The protruding part of the catching pin 1.1 passes through a recess 4.1.1 of a securing strap 4.1 in a contactless manner, the securing strap 4.1 being the catching device 4 in the exemplary embodiment of a joint unit according to the present invention, which embodiment is being shown here. The securing strap 4.1 is fastened on the axle of a utility vehicle during the mounting of the joint unit together with the connection flange 5 by means of a screw connection.

A sealing bellows 9 is used to seal the inner joint components of the joint unit shown in FIG. 1 against contaminants. This bellows has two fastening areas 9.1 and 9.2, by means of which it is sealingly fastened to the housing 1 and the pivot 2.

There is no contact between the catching pin 1.1 and the securing strap 4.1 during normal operation of the joint unit being shown. The elongated hole-like recess 4.1.1 (better recognizable in FIG. 2) in the securing strip 4.1 has sufficient dimensions for this. This would lead to an axial motion of the housing 1 in the direction of the central axis of the bearing in case of a developing separation of the housing 1 from the pivot 2, so that the catching pin 1.1 would migrate outwardly in the direction of the upper strap-like area of the securing strap 4.1. This mobility of the housing in the axial direction relative to the pivot 2 would consequently be possible until the catching pin 1.1 assumes its function and comes into contact with the securing strap 4.1. The driver of the vehicle would inevitably notice such a disturbance of the wheel suspension, so that the vehicle can be brought to a repair shop with the emergency running function guaranteed hereby in order to replace the necessary components.

Figure 2:
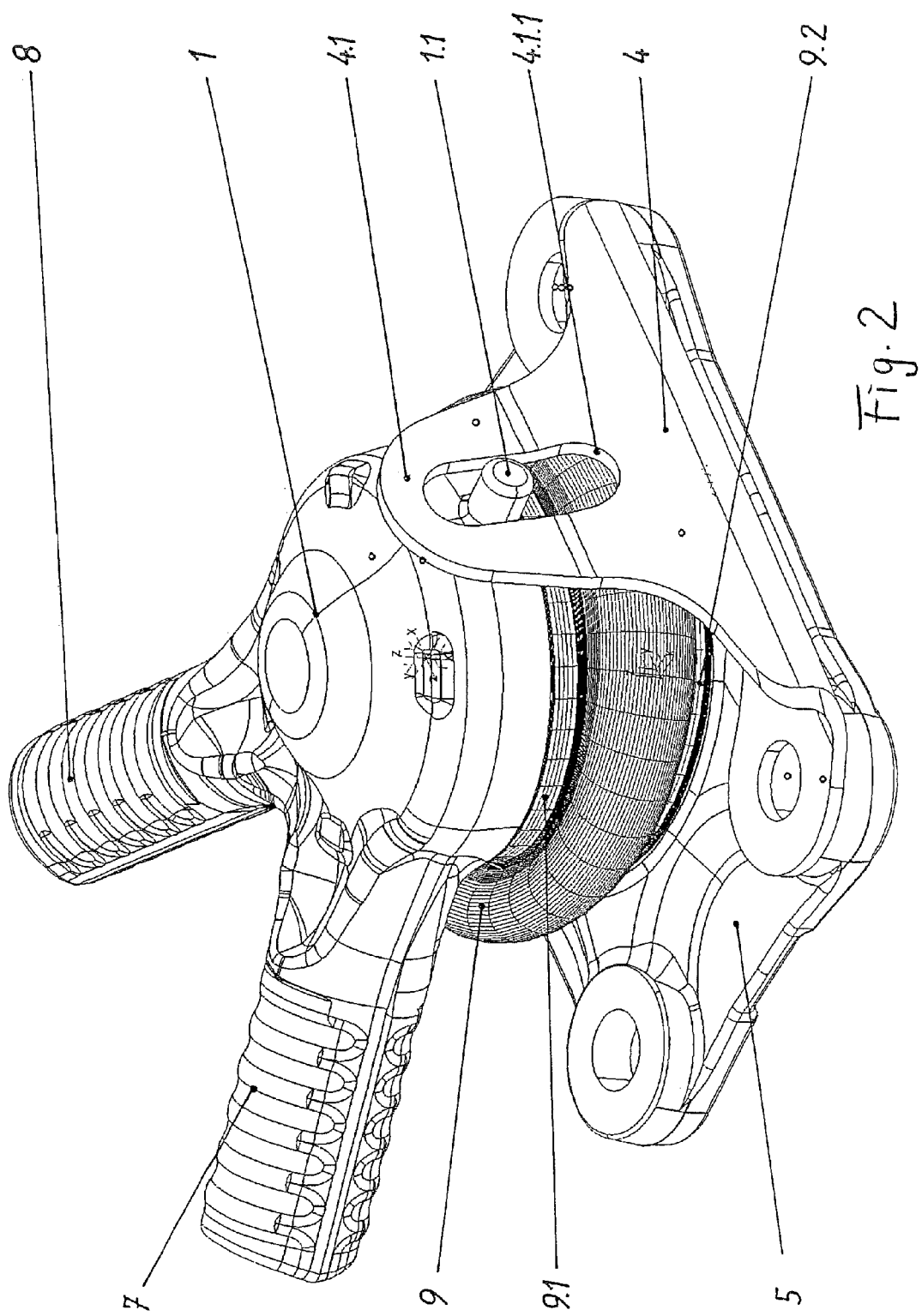
FIG. 2 is a perspective view of the steering triangle central joint according to FIG. 1.

FIG. 2 shows the joint unit shown in FIG. 1 in a perspective view. The control arms 7 and 8 indicated as details are parts of a steering triangle for utility vehicles. Moreover, the catching pin 1.1 made integrally in one piece with the housing 1 can be recognized on the side located opposite the control arms 7 and 8. This catching pin 1.1 passes through the recess 4.1.1 of the catching device 4, which is designed as a securing strap 4.1 here. The securing strap 4.1 is fastened to the axle body of the rear axle of a utility vehicle together with the connection flange 5 in the manner already mentioned above.

Furthermore, the outside of the sealing bellows 9, which is arranged between the housing 1 and the pivot 2 and protects the inner components of the joint from entering contaminants, is recognizable in FIG. 2. The sealing bellows 9 is held sealingly on the aforementioned parts of the joint unit 1 by means of its fastening areas 9.1 and 9.2.

Figure 3:
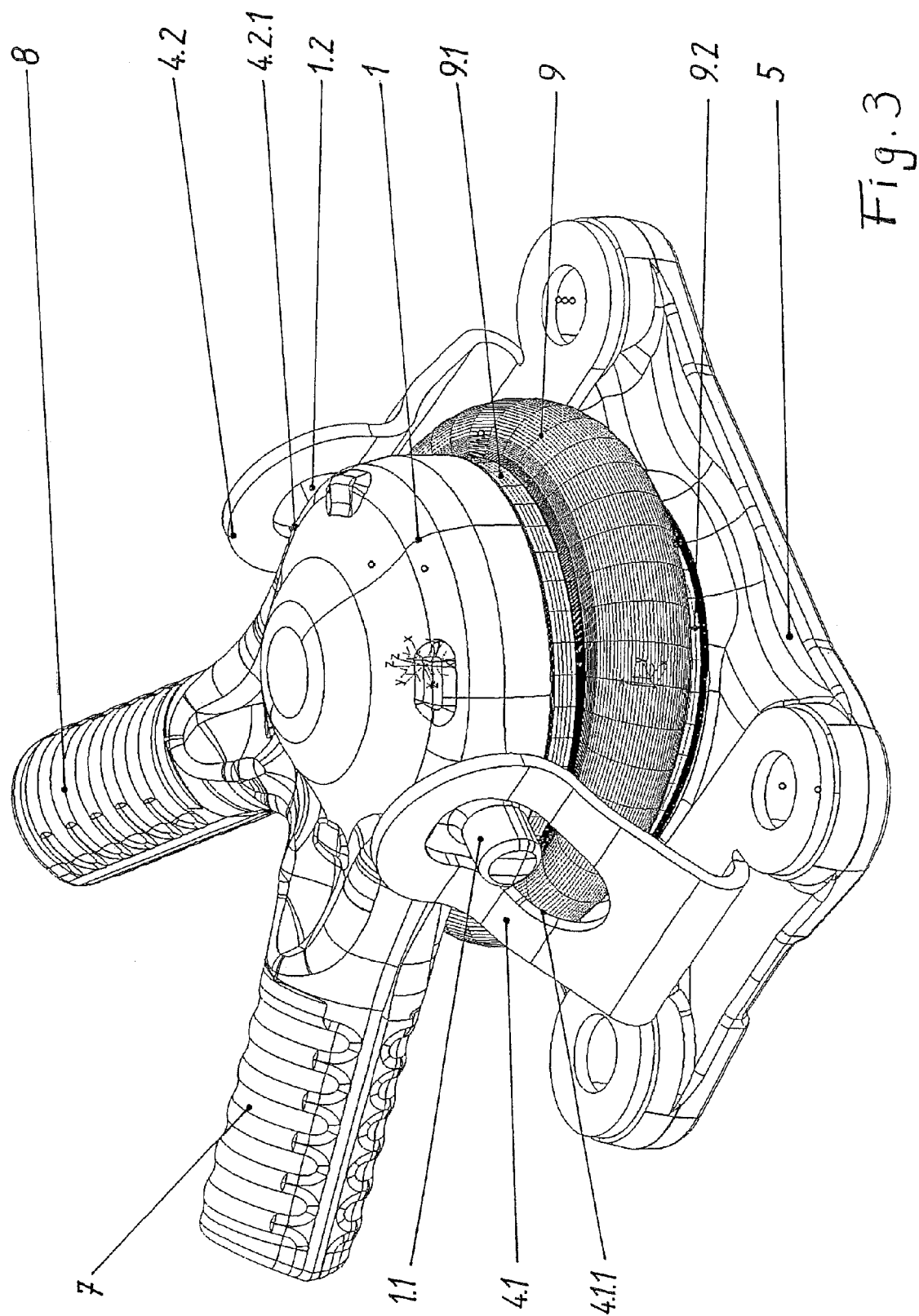
FIG. 3 is a second embodiment of a joint unit according to the present invention based on the example of a central joint for a steering triangle of a utility vehicle.

FIG. 3 shows, contrary to the above-described embodiments, a variant of a joint unit 1 with two catching devices, which are fastened to the connection flange 5 opposite each other and comprise a securing strap 4.1 and 4.2, respectively, in this case. The securing strap 4.1 has an elongated hole-like recess 4.1.1, whereas such a recess 4.2.1 is present in the securing strap 4.2. A catching pin 1.1 and 1.2, respectively, passes through these recesses 4.1.1 and 4.2.1. The respective catching pin 1.1 and 1.2 fastened to the housing 1 is freely movable within the recesses, without there being a contact between the catching pin, on the one hand, and the securing strap 4.1 or 4.2, on the other hand, as long as normal operation, i.e., reliable functioning of the joint unit shown, is guaranteed. Just as in the above-described embodiment variant, the central joint shown in FIG. 3 has a sealing bellows 9 with a fastening area 9.1 and 9.2. The securing straps 4.1 and 4.2 are fastened together with the connection flange 5 in this variant as well.

Figure 4:
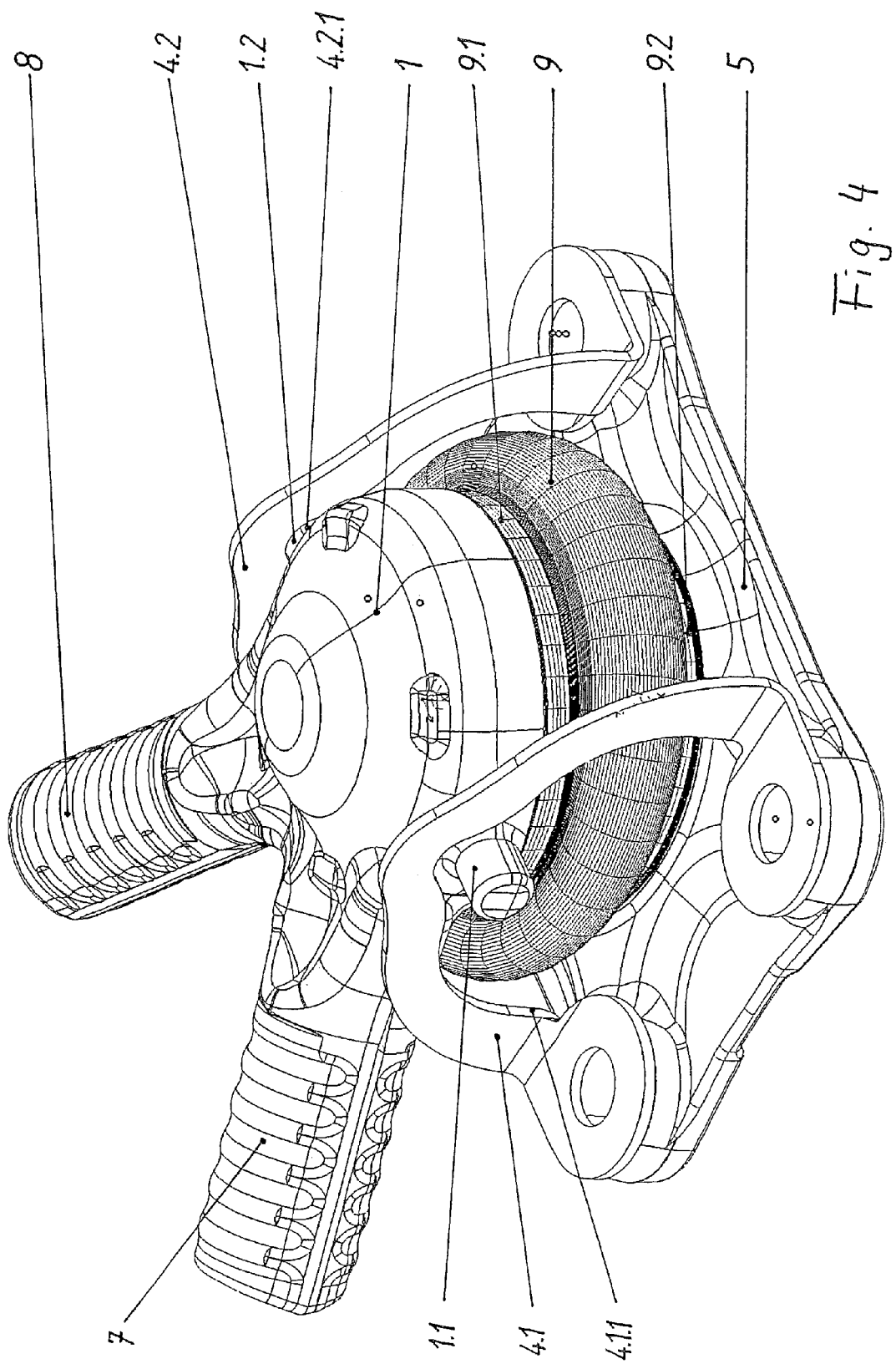
FIG. 4 is a third embodiment of a joint unit according to the present invention, likewise shown on the basis of the steering triangle central joint of a utility vehicle.

Another embodiment of a joint unit 1 according to the present invention is shown in FIG. 4. Contrary to the above-described variants of a joint unit, the securing straps 4.1 and 4.2 are arc-shaped here and span over the corresponding catching pins 1.1 and 1.2 as part of the housing 1 in an extensive plane. Approximately in the center, the securing straps 4.1 and 4.2 have a geometry that enables the respective catching pins 1.1 and 1.2 to come into contact with the respective securing straps 4.1 and 4.2 in a defined position in case of separation of the housing 1 from the pivot 2 in order to thus guarantee the emergency running function of the joint unit according to the present invention. As was explained before, the securing straps 4.1 and 4.2 are fastened on the vehicle axle of the utility vehicle by fixing the connection flange 5.

Figure 5:
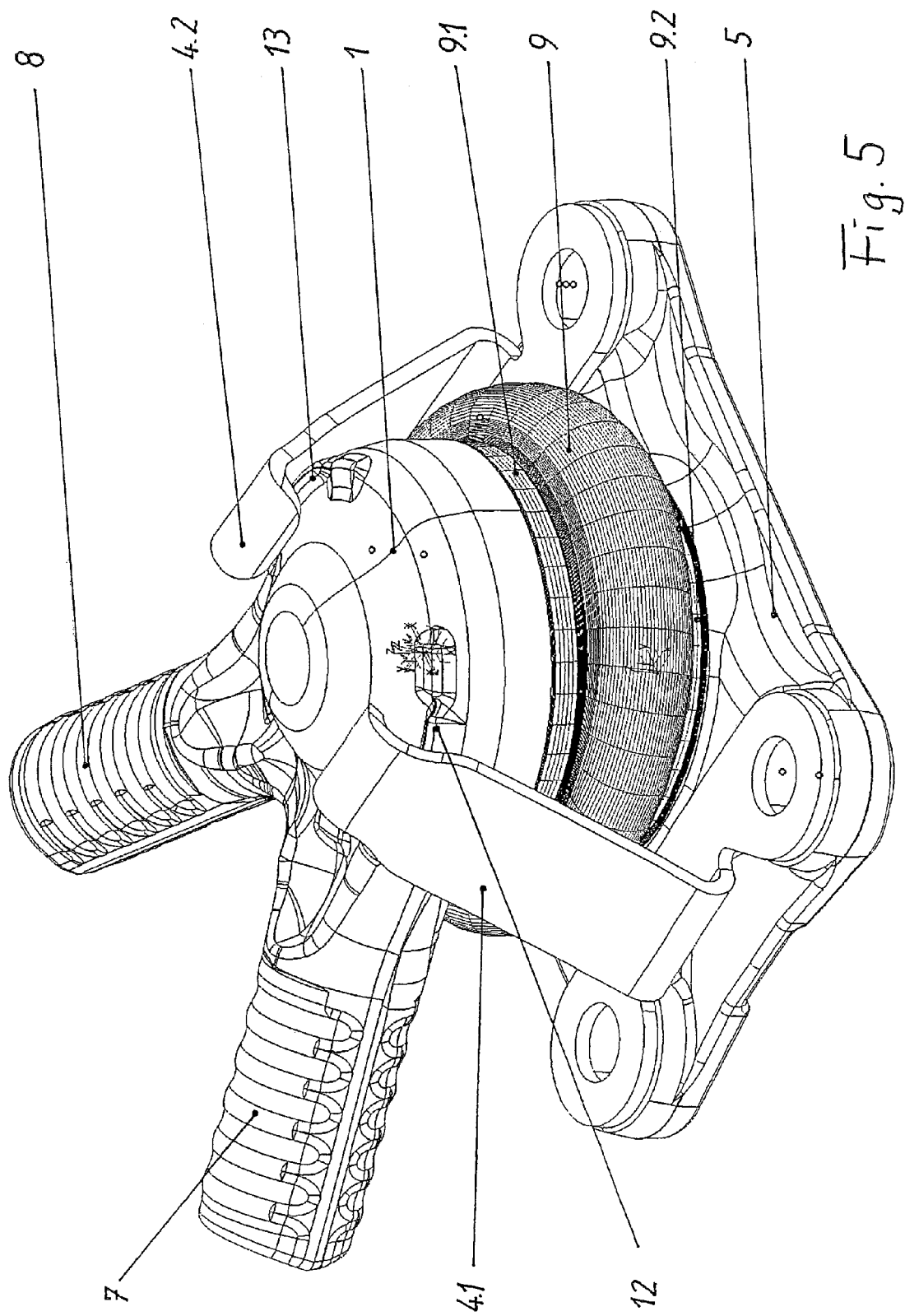
FIG. 5 is a fourth embodiment of a joint unit according to the present invention with a catching device, again based on the example of a steering triangle central joint for a utility vehicle.
Figure 6:
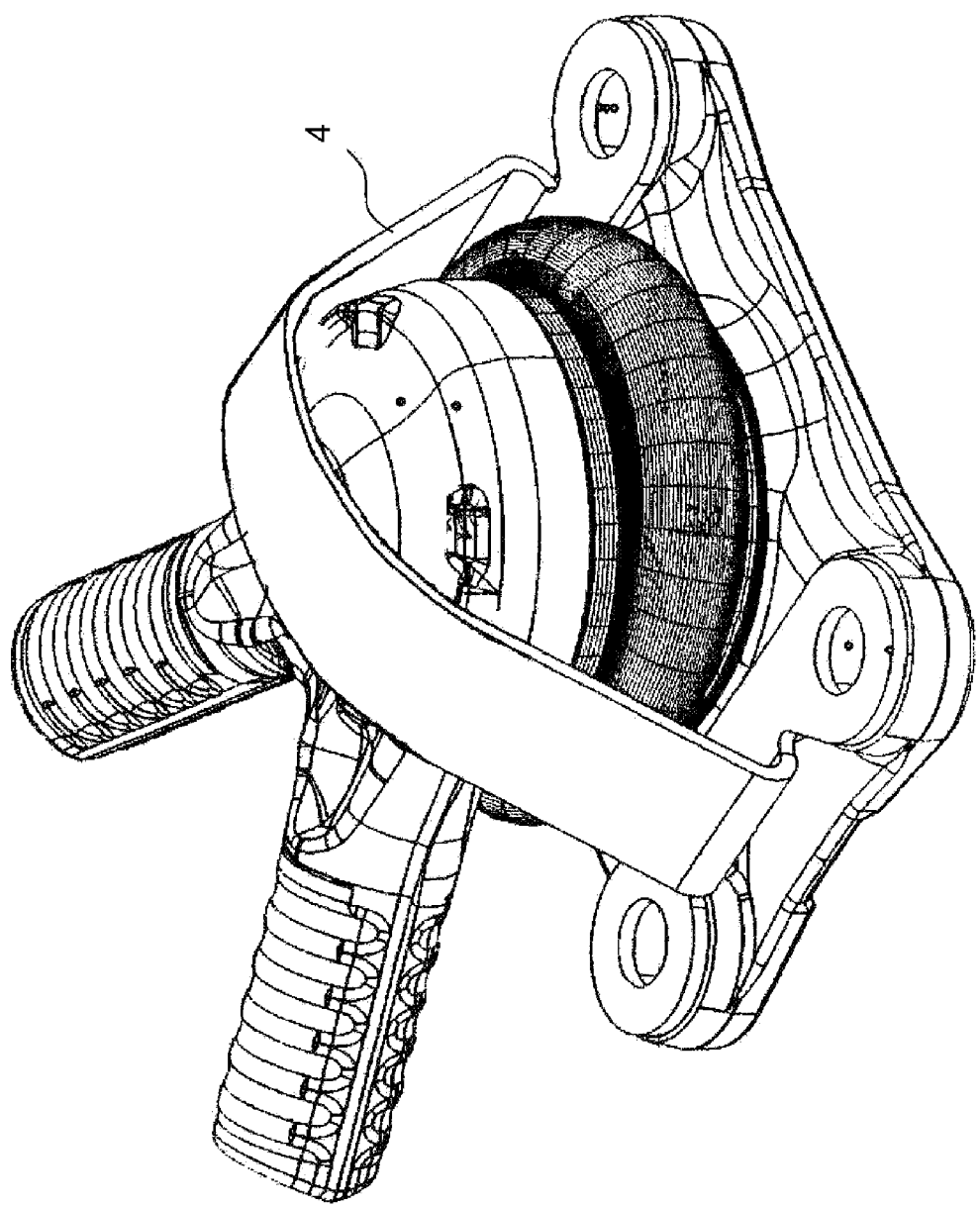
FIG. 6 is a fifth embodiment of a joint unit according to the present invention with a catching device based on the example of a steering triangle central joint of a utility vehicle.

The perspective view of a joint unit shown in FIG. 5 also guarantees an emergency running function in a simple manner for the case in which the housing 1 separates from the pivot 2. No catching pin was provided on the housing for this purpose. The catching device 4 rather comprises two securing straps 4.1 and 4.2, which are located opposite each other and span over a part of the surface of the housing 1 without making contact with it as long as the joint unit assumes its function. When viewed in the axial direction of the central axis of the bearing, the end sections of the securing straps 4.1 and 4.2 are located at spaced locations from the surface of the housing 1. In case of developing separation of the housing 1 from the pivot 2, the surface of the housing 1 and the claw-like end areas of the securing straps 4.1 and 4.2 come into contact with one another. To prevent these claw-like end areas from slipping off, an associated, bead-like elevation 12, 13 each is formed on the surface of the housing 1 in the embodiment being shown. This bead-like elevation 12 or 13 is not absolutely necessary, but it was considered to be meaningful in the embodiment being shown.

While specific embodiments of the invention have been shown and described in detail to illustrate the application of the principles of the invention, it will be understood that the invention may be embodied otherwise without departing from such principles.

The invention claimed is:

1. A motor vehicle wheel suspension control arm joint unit comprising:
   a housing comprising a first radially extending catching pin and a second radially extending catching pin;
   a pivot with a spheroidal bearing surface, said pivot being mounted slidingly in said housing and maintained by said housing in an operative pivoting range;
   a catching device extending from said pivot and comprising:
   two securing straps, each of said two securing straps spanning over part of said housing during operation in said operative pivot range, each of said two securing straps comprising a recess, said first radially extending catching pin extending into said recess of one of said two securing straps, said second radially extending catching pin extending into said recess of another one of said two securing straps, said two securing straps not contacting said first radially extending catching pin and said second radially extending catching pin during operation in said operative pivot range wherein said securing straps have a geometry that enables the respective catching pins to come into contact with the respective securing straps in a defined position in case of separation of the housing from the pivot.

2. A joint unit in accordance with claim 1, wherein each of said two securing straps comprises a first bent portion and a second bent portion, said second bent portion being located radially inward from said first bent portion, said recess being located in an area of said second bent portion, said second bent portion including an axially extending portion, said axially extending portion of one of said two securing straps being substantially parallel to said axially extending portion of another one of said two securing straps, each of said catching pins being integrally connected to said housing, each of said catching pins extending from said housing in an outward radial direction.

3. A joint unit in accordance with claim 1, wherein said two securing straps stop relative movement between said pivot and said housing at a location beyond said operative pivot range by a positive engagement of said housing relative to said pivot at a location spaced from said operative pivot range.

4. A joint unit in accordance with claim 3, wherein said one of said two securing straps is arranged on one side of said housing, said another one of said securing straps being arranged on another side of said housing, said one of said two securing straps being located opposite said another one of said two securing straps.

5. A joint unit in accordance with claim 4, wherein said two securing straps each span over a portion of said housing.

6. A joint unit in accordance with claim 1, further comprising a connection flange connected to said pivot, said two securing straps being made integrally in one piece with said connection flange for connection to an axle body of an axle.

7. A joint unit in accordance with claim 6, wherein said pivot is fastened to said connection flange or is formed on said connection flange and a spheroidal bearing surface is part of a joint ball which is mounted on said pivot or is formed on said pivot.

8. A joint unit in accordance with claim 7, wherein said joint ball is received in a bearing shell inserted into said housing.

9. A joint unit in accordance with claim 1, further comprising a sealing bellows, which protects the inner components of the joint from contaminants and is arranged between said housing and said pivot, one of said two securing straps being located at a spaced location from one portion of said sealing bellows, another one of said two securing straps being located at a spaced location from another portion of said sealing bellows.

10. A joint unit in accordance with claim 1, wherein the joint unit forms the central joint of a steering triangle of a motor vehicle suspension and said housing is connected to a control arm.

11. A joint unit of a control arm of a wheel suspension in a motor vehicle, the joint unit comprising:
  a housing comprising a plurality of catching pins;
  a pivot with a spheroidal bearing surface, said pivot being mounted slidingly in said housing by means of said spheroidal bearing surface;
  a catching device extending from said pivot and comprising a first securing strap and a second securing strap, said first securing strap being located opposite said second securing strap, said first securing strap spanning a portion of said housing without contacting said housing when said housing and said pivot are in a connected state, said second securing strap spanning another portion of said housing without contacting said housing when said housing and said pivot are in said connected state, said first securing strap having a first recess, said second securing strap having a second recess, one of said catching pins protruding into said first securing strap without contacting said first securing strap when said housing and said pivot are in said connected state, another one of said catching pins protruding into said second securing strap without contacting said second securing strap when said housing and said pivot are in said connected state wherein said securing straps have a geometry that enables the respective catching pins to come into contact with the respective securing straps in a defined position in case of separation of the housing from the pivot.

12. A joint unit in accordance with claim 11, wherein said first recess is a first elongated hole, second recess being a second elongated hole.

13. A joint unit in accordance with claim 11, wherein said first recess and said second recess are arc-shaped.

14. A joint unit in accordance with claim 11, wherein said housing is arranged between said first securing strap and said second securing strap.

15. A joint unit in accordance with claim 14, further comprising a connection flange, said first securing strap and said second securing strap being fastened to said connection flange, said first securing strap and said second securing strap being connected to said pivot via said connection flange.

* * * * *